United States Patent
Serinken et al.

[19]

[11] Patent Number: 5,864,544
[45] Date of Patent: Jan. 26, 1999

[54] TDD COMMUNICATION SYSTEM WHICH RECEIVES TIMING SIGNALS FROM A SATELLITE AND AUTOMATICALLY, SUCCESSIVELY, REPETITIVELY, AND ALTERNATINGLY TRANSMITS AND RECEIVES COMPRESSED SIGNALS IN A SINGLE CHANNEL

[75] Inventors: Nur M. Serinken, Kanata; Sherman M. Chow, Stittsville, both of Canada

[73] Assignee: Her Majesty the Queen in Right of Canada as represented by the Minister of Communications, Ottawa, Canada

[21] Appl. No.: 650,848

[22] Filed: May 20, 1996

[51] Int. Cl.⁶ .............. H04B 1/44; H04B 7/005; H04J 3/00; H04L 5/14

[52] U.S. Cl. .......... 370/282; 370/278; 370/280; 370/294; 455/502

[58] Field of Search ............. 370/278, 280, 370/277, 282, 294, 503; 455/502, 503, 13.2

[56] References Cited

U.S. PATENT DOCUMENTS

| | | |
|---|---|---|
| 4,630,257 | 12/1986 | White ........................... 370/29 |
| 4,644,524 | 2/1987 | Emery ........................... 370/29 |
| 5,285,443 | 2/1994 | Patsiokas ....................... 370/337 |
| 5,347,562 | 9/1994 | Candy .......................... 370/280 |
| 5,355,477 | 10/1994 | Takahashi et al. ............... 370/280 |
| 5,570,349 | 10/1996 | Bustamante ..................... 370/209 |
| 5,732,076 | 3/1998 | Ketseoglou ..................... 370/347 |

FOREIGN PATENT DOCUMENTS 2172477  12/1980  United Kingdom .

*Primary Examiner*—Douglas W. Olms
*Assistant Examiner*—David R Vincent
*Attorney, Agent, or Firm*—Pascal & Associates

[57] ABSTRACT

A first terminal for use in a time division duplex communication system comprising apparatus for automatically, successively, repetitively and alternatingly transmitting and receiving compressed signals to and from another terminal via a single transmit and receive time divided channel, including apparatus for changing a transmit and receive mode of the first terminal in synchronism with an opposite transmit and receive mode of another terminal, apparatus for receiving a timing signal which is the same timing signal received by another terminal, and apparatus for changing the mode at intervals determined from reception of the timing signal.

18 Claims, 4 Drawing Sheets

TDD COMMUNICATION SYSTEM WHICH RECEIVES TIMING SIGNALS FROM A SATELLITE AND AUTOMATICALLY, SUCCESSIVELY, REPETITIVELY, AND ALTERNATINGLY TRANSMITS AND RECEIVES COMPRESSED SIGNALS IN A SINGLE CHANNEL

FIELD OF THE INVENTION

This invention relates to the field of communication and in particular to a system and method for duplex communication via a single channel.

BACKGROUND TO THE INVENTION

Conventional telephone systems operate in full duplex mode. This means that both parties linked by the telephones can speak at the same time. Many radio systems operate in a mode known as half duplex mode which means that only person at an end can talk at a time. The direction of the communication is controlled by a "press to talk button" which is activated by the party wishing to speak. In order to avoid confusion, the party that is talking must indicate verbally that the user is relinquishing the channel by saying "over". Examples of such systems include air to ground radios, HF radios and many portable radio systems. The reason for the popularity of half duplex despite its inconvenience is that it uses only one frequency, an important consideration where frequencies are at a premium. One disadvantage of a manually controlled half duplex communications system is that it is difficult to interface a half duplex radio system to a conventional telephone. In addition, normal conversation which allows one party to interrupt the other is impeded by the press to talk operation. This is especially annoying for persons accustomed to the normal telephone system which is full duplex.

A channel which has only sufficient capacity to carry voice information in one direction generally cannot be used to provide a two way voice link simultaneously.

Full duplex can be achieved if the two ends of the link operate in what is known as Time Division Duplex (TDD) mode. The channel is allocated 50 percent of the time to transmit information in each of the two directions. That is, the radio channel is divided into time slots of T/2 seconds, each end transmitting in alternate time slots. When one end is transmitting, the opposite end is receiving the information. In this way one frequency can be used for information flow in both directions resulting in a full duplex link.

One such system is the cordless telephone system known as CT2 in which the voice is digitized by an ADPCM codec to 32 kbits/sec. The transmission rate of the data through the radio channel is about 64 kbits/sec, so that in each T/2 second time slot 64 kbits of information are transmitted in each direction. In addition some additional bits are introduced into the data to accommodate synchronization and other "house keeping" information needed to keep the timing between the two ends of the link aligned. The data received within the T/2 time slot at 64 kbits/sec is expanded to form a uniform 32 kbit/sec bit stream after house keeping information is stripped off, and is applied to the codec to be converted to voice. For the TDD system to work the channel must be capable of carrying more than twice the data rate needed for one voice codec.

For systems such as HF radio, and VHF AM radios used for air traffic control the maximum rate that can be carried reliably within the assigned band is not sufficient for transmission of voice using time division duplex as described in the previous paragraph with the present state of the speech coding and data transmission technology. For example, HF radios have the capability to carry data reliably at 2.4 Kbits/sec and a codec which can encode high quality voice at 1.2 kbits/sec does not presently exist.

A system which allows a full duplex voice communication such as a telephone conversation over the same narrowband radio channel uses time compression of the voice signal and analog time division multiplex of the channel, is described in U.S. Pat. No. 5,355,363 dated Oct. 11, 1994, invented by Takahashi et al. In that system, a segment of analog voice with duration T seconds is converted into a segment of analog signal with duration T/2 seconds. The encoded version of the (analog) voice signal occupies a bandwidth which meets the requirements of the regulatory bodies, so but in order to contain the signal with the channel, at least half of the voice bandwidth is eliminated. This substantially degrades the fidelity of the signal.

In the system described in the patent, the transmit and receive timing for the channel is determined by a synchronization signal that is transmitted in the same channel the analog signal, which of course limits the channel time, restricting further the frequencies of the signal that can be transmitted, and the resulting fidelity of the voice signal.

SUMMARY OF THE INVENTION

The present invention is an improvement to the concepts, methods and structures described in the aforenoted U.S. patent, in that in one embodiment, no synchronization signal need be transmitted in the channel. A timing signal is obtained from a source which is available to all terminals connected to the channel. This can be provided in a separate timing channel, but preferably is obtained from an earth satellite such as one of a global positioning system of the kind presently in place around the world. In the latter case, no separate channel synchronization signal is required to be sent between terminals, e.g. from one terminal to another. This allows maximum duplex channel capacity to be used for the transmission of signal payload in both channel directions.

In accordance with another embodiment, a synchronization signal is used, but this signal has a particular characteristic which informs the terminals in which transmitting direction the channel is to be placed. For example, the form of the synchronization signal can indicate that the terminal should be placed in a transmitting mode, or in a receiving mode. Thus the synchronization signal becomes not only a synchronization signal but also a control signal.

Preferably the synchronization signal is a chirp signal, which is placed either at the beginning or at the end of a burst of transmitted compressed analog signal. If the chirp signal is a rising frequency signal (an up chirp), this can indicate for example that the terminal should be placed in a receive mode; if the chirp signal is a dropping frequency signal (a down chirp), this can indicate for example that the terminal should be placed in a transmit mode. Recognition by the terminal of the form of chirp signal thus controls the transmit or receive mode of the terminal. This overcomes the problem of the timing getting 180 degrees out of sync in the prior art system, and resulting shutdown of the channel due to no return synchronization signal being transmitted.

In accordance with another embodiment of the present invention, an improved compression technique is used, which is based on a time domain technique, and preferably a waveform similarity synchronized overlap-add compression technique. This provides at least 2:1 compressed transmission in the narrow bandwidth of the single time divided duplex channel, high quality voice recovery.

An embodiment of the present invention is a first terminal for use in a time division duplex communication system comprising apparatus for automatically, successively, repetitively and alternatingly transmitting and receiving compressed signals to and from another terminal via a single transmit and receive time divided channel, including apparatus for changing a transmit and receive mode of the first terminal in synchronism with an opposite transmit and receive mode of another terminal, apparatus for receiving a timing signal which is the same timing signal received by another terminal, and apparatus for changing the mode at intervals determined from reception of the timing signal.

In accordance with another embodiment, a terminal for use in a time division duplex communication system comprising apparatus for automatically, successively, repetitively and alternatingly transmitting and receiving compressed signals in a single transmit and receive time divided channel, including apparatus for changing a transmit and receive mode of the terminal under control of a mode changing signal, the apparatus for changing comprising detecting a particular form of channel synchronization signal at the beginning or at the end of a received burst of signal, and generating the mode changing signal in response to the form of channel synchronization signal that is detected.

In accordance with another embodiment, a method of time division duplex communication comprising time dividing a single communication channel into successive evenly spaced short time intervals, transmitting and receiving time domain compressed speech signals alternatively in each direction in the time divided duplex communication channel, and synchronizing timing of the time division from a single source of timing signal accessible by each station communicating via the channel.

In accordance with another embodiment, a method of time division duplex communication comprising time dividing a single communication channel into successive evenly spaced short time intervals, transmitting and receiving time domain compressed speech signals alternatively in each direction in the time directed duplex communication channel, transmitting a chirp signal at the beginning or at the end of each burst of compressed speech signal, and changing a transmit or receive mode at a terminal of the communication channel upon receipt of the chirp signal.

BRIEF INTRODUCTION TO THE DRAWINGS

A better understanding of the invention will be obtained by considering the detailed description below, with reference to the following drawings, in which:

FIG. 1 is a block diagram of a prior art system,

FIG. 2 is a block diagram of a system in accordance with anbodiment of the present invention, FIG. 3 illustrates a representative 11.5 seconds of a speech signal, FIG. 4 illustrates the speech signal of FIG. 3 compressed/ with 100 millisecond gaps for channel multiplexing, FIG. 5 illustrates the speech signals of FIG. 4 after expanding, and FIG. 6 is a block diagram of a system in accordance with another embodiment of the present invention.

DETAILED DESCRIPTION OF THE INVENTION

Figure 1:
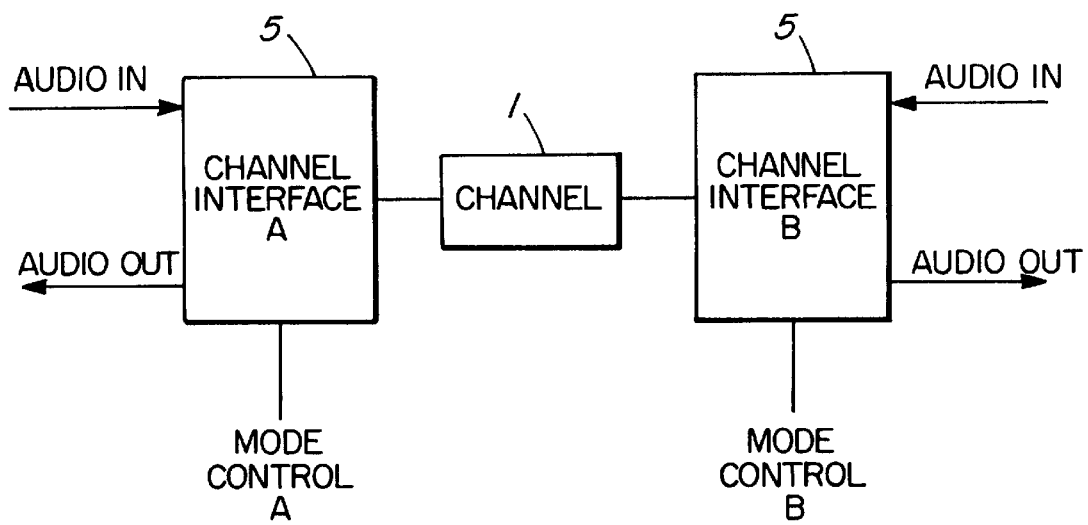

An audio transmission path as shown in FIG. 1 over a band limited channel 1 is intended to be half duplex when audio information can only be transmitted from channel interface A to channel interface B or from channel interface B to channel interface A but not simultaneously. An example of such a channel is a radio system using one frequency to transmit and receive radio signals. Many radio systems operate in the half duplex mode, where access to the channel is controlled by the user. One example of half-duplex system is an HF radio used for transmission of voice.

The access to the channel is made by the mode control port 5 of the channel interface which ideally puts the channel interface into either the information transmit or information receive mode but not both at the same time. In HF radio systems the mode control is a press to talk switch which is activated by the user. If the radio system is interfaced to a telephone network the decision to transmit is made by a voice detection relay activated by the speech signal received from the telephone network.

One characteristic of the half duplex channel is that the control ports which control the channel access are not synchronized; access is asynchronous. When both channel interfaces A and B are put into transmit mode then information originating from neither channel interface A nor B reach their destinations.

A duplex channel is a communication system where information can flow from channel interface A to channel interface B and channel interface B to channel interface A simultaneously, and mode control ports are not required to avoid contention because channel access is controlled by a protocol.

In order to provide full duplex service over half duplex channels a technique known as Time Division Duplex (TDD) can be used, whereby the channel information flow is organized so that 50% of the time information is allowed to go from A to B and for the remaining 50% of the time information flow is from B to A. For example transmission of 4 kHz band limited audio is accomplished by sampling the audio signal at 8 kHz and coding the sample with Pulse Code Modulation (PCM) which generates 8-bits every 125 micro seconds and converted into a serial data stream of 64000 bits per second. The digital data stream is transmitted at a rate equal or greater than 128 kilobits per second from A to B, also the same operation is performed for the audio signal at the location B. The digital data for the audio signal at the location B is transmitted to A for the remaining 62.5 microseconds. The synchronization of mode controls for channel interfaces is performed either by sending control signals prior to the transmission of the PCM data stream representing the audio signal or by external means. The digital TDD technique described can operate on channels where high speed digital information transmission is feasible. For channels where the bandwidth does not support digital data transmission that reproduces the audio signal faithfully duplex service is not possible.

The system described in the aforenoted U.S. Pat. No. 5,355,363 is a time division duplex system, in which the signals applied to the mode control ports (FIG. 1) are obtained from synchronization signals transmitted with the compressed audio signals, thus achieving automatic reversal of the transmit and receive modes of a terminal.

Figure 2:
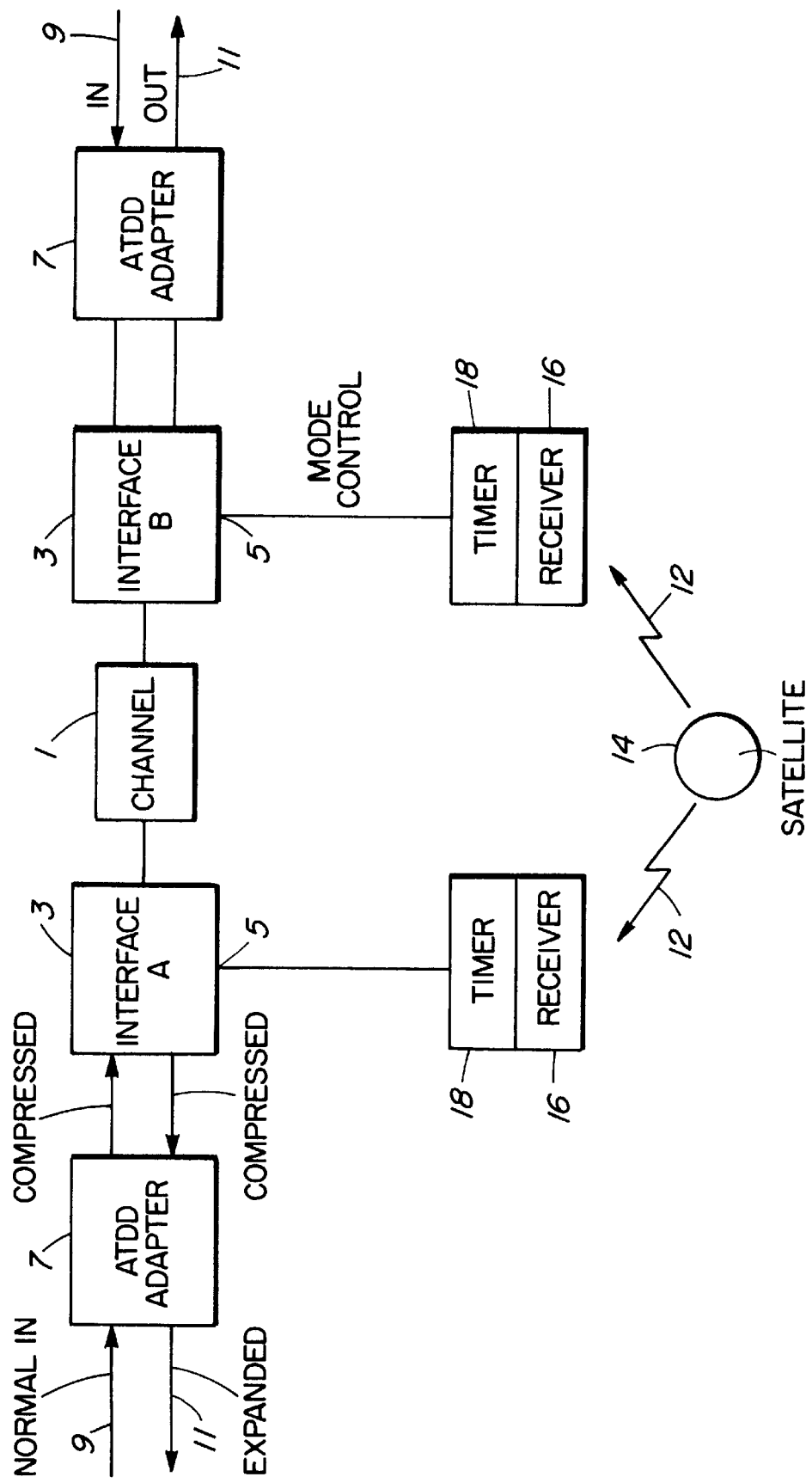

An embodiment of the present invention is shown in FIG. 2. In this case a channel interface A or B is used as in the prior art system described with reference to FIG. 1, with a mode control port 5, at each terminal. However in the present invention analog time division duplexing adapters (ATDD) 7 are used, interfacing normal audio input and normal audio output lines 9 and 11 with the channel interfaces A and B respectively. The ATDDs 7 compress the normal audio signal input to it from line 9 in accordance with a time domain technique and output a resulting compressed signal to the interface 3 connected to it. Similarly, received compressed audio signals provided to the ATDD 7 are expanded in the ATDD and normal received audio signals are output on line 11.

Preferably the ATDD adapters 7 can also insert reference signals in the signal output from each to indicate the beginning and end of the compressed speech signal. The transmission of the reference signals occupy part of the time allocated for each transmission which results in an adjustment of the compression and expansion factors to compensate for the transmission of the reference signal. For example, if the transmission from interface A to interface B is 100 milliseconds and within that 100 milliseconds, 10 milliseconds is allocated for the transmission of the reference signal, the compressed speech will occupy 90 milliseconds. Thus 200 milliseconds of input speech will be compressed to 90 milliseconds with a compression factor of 0.45 which will be expanded to 200 milliseconds by an expansion factor of 2.22 at the receiving terminal by the adapter at the receiving terminal.

The reference signal can be unique for each particular station for the identification of the time slot of individual stations. Unique reference signals also allow channel monitoring and network management for systems utilizing the ATDD.

The adapter 7 performs time scale compression and expansion on the incoming audio signal. The time scale conversion is performed on audio signals in such a way that the bandwidth, the naturalness of the original signal are preserved. If the audio signal is speech, the articulation rate is altered without modification of the pitch and format structure of the input signal. While there are various forms of compressors that use the time domain to obtain high quality compression and expansion of audio signals, a preferred technique is an overlap-add technique which is described in the article "An Overlap-Add Technique Based On Waveform Similarity (WSOLA) For High Quality Time-Scale Modification Of Speech", by Werner Verhelst and Marc Roelands, pp II-554–II-557, Proc. IEEE Conference on Acoustics Speech And Signal Processing, ICASSP 1993, which is incorporated herein by reference. The adapter time compresses the audio signal at least 50% or more producing analog signals that are fed to the channel interface audio input port. The adapter processes n seconds of audio into a buffer n/2 seconds in length if the compression factor is 0.5. For example 200 milliseconds of speech will be compressed into 100 milliseconds. The output of the adapter is a burst of audio that is equal to the input buffer duration multiplied by the compression factor. The compressed burst of audio is fed to the channel interface for transmission to location B.

At the location B the channel interface output is fed to the Expand in port of the adapter. The duplex adapter at the location B expands the audio signal with the inverse of the compression factor used the location A. The audio signal output from the adapter at the location B is a faithful representation of the audio signal that is fed to the adapter at the location A. The process for the signals going from B to A undergoes the inverse operation and the compressed signal representing the audio input is transmitted from B to A when A is not transmitting information.

The duplex adapter introduces delay that is proportional to the compression factor and burst length of the transmission. the user of the duplex adapter can now transmit information simultaneously over bandlimited channels.

Figure 3:
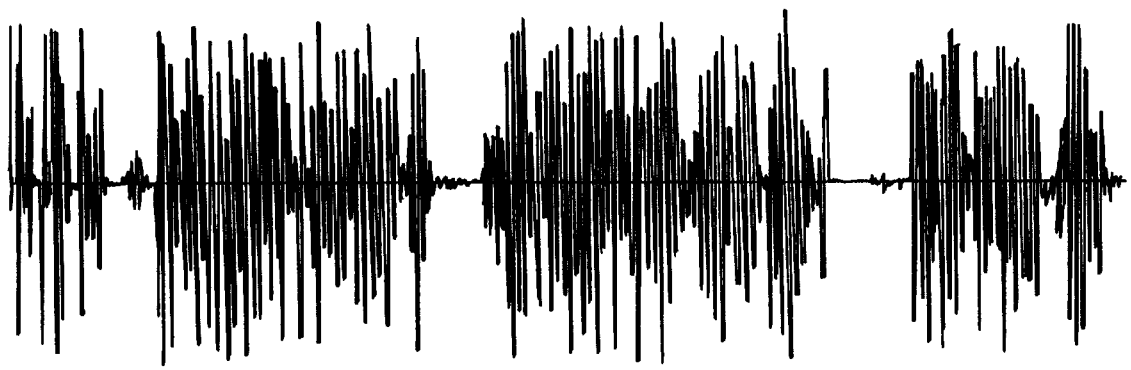
Figure 4:
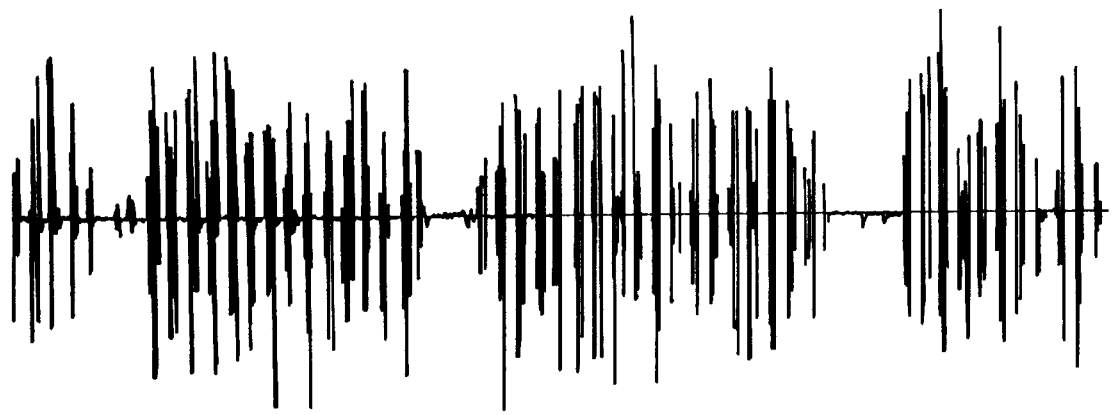

A sample of 11.5 seconds of normal speech is shown in FIG. 3. The processed audio output from the duplex adapter 7 is shown in FIG. 4. The speech signal is processed by the adapter 7 by compressing 200 milliseconds of the input signal by a factor 0.5 and inserting 100 millisecond of gap after every 100 milliseconds of processed speech signal. During the time where there are gaps the far end adapter 7 will be transmitting the compressed signal in the reverse direction.

During the silent periods of transmission from A to B, a corresponding 100 milliseconds of audio burst is transmitted from interface B to A thus providing full duplex operation. The compressed from signal A, shown in FIG. 4 is received from the channel at the interface B and fed to the adapter expand port of the ATDD adapter 7 for reconstruction of the original signal.

Figure 5:
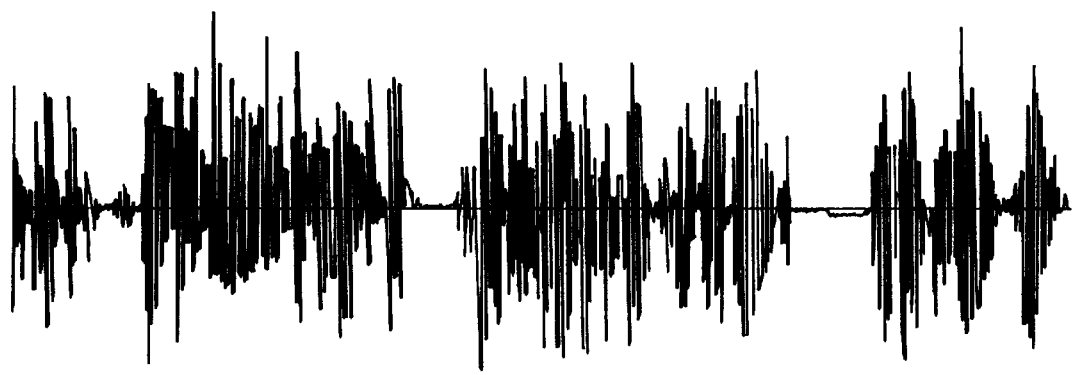

The audio output from the adapter 7 is shown in FIG. 5 for 11.5 seconds of the speech signal that is processed by the duplex adapters of the system described in this document. The audio processing used in the adapter does not remove silent periods of the input signal and therefore the compression and multiplex operation does not depend on the statistical characteristics of the input signal.

Returning to FIG. 2, a common timing source, preferably a clock signal 12 transmitted by an earth satellite 14 is received by a receiver 16 at each terminal. The receiver 16 detects the clock signal, and provides it to a timer 18. The timer counts the clock signal, and at predetermined intervals determined by the timer 18 applies mode control signals to the respective mode control inputs 5 of the interfaces A and B. The interfaces thus continuously alternate modes, one transmitting and the other receiving, during successive time intervals of the channel.

It may thus be seen that no synchronization data is required to be transmitted between terminals, since both are synchronized to the common clock signal, during normal transmission.

It will of course be recognized that prior to the normal transmission, an initialization will be required in order to align the channel times at both terminals, if a an undifferentiated clock signal is provided via a general synchronization channel from a source such as a head end radio channel. However this can be dispensed with if universal channel timing is adopted based on actual times determined from the satellite, such as can be obtained from the preferred global positioning system. Such systems can provide accurate reference signals synchronized to a few hundred nanoseconds, and allow the ATDD 7 to utilize the clock signal as a reference signal to synchronize the duplexing of the radio channel.

Figure 6:
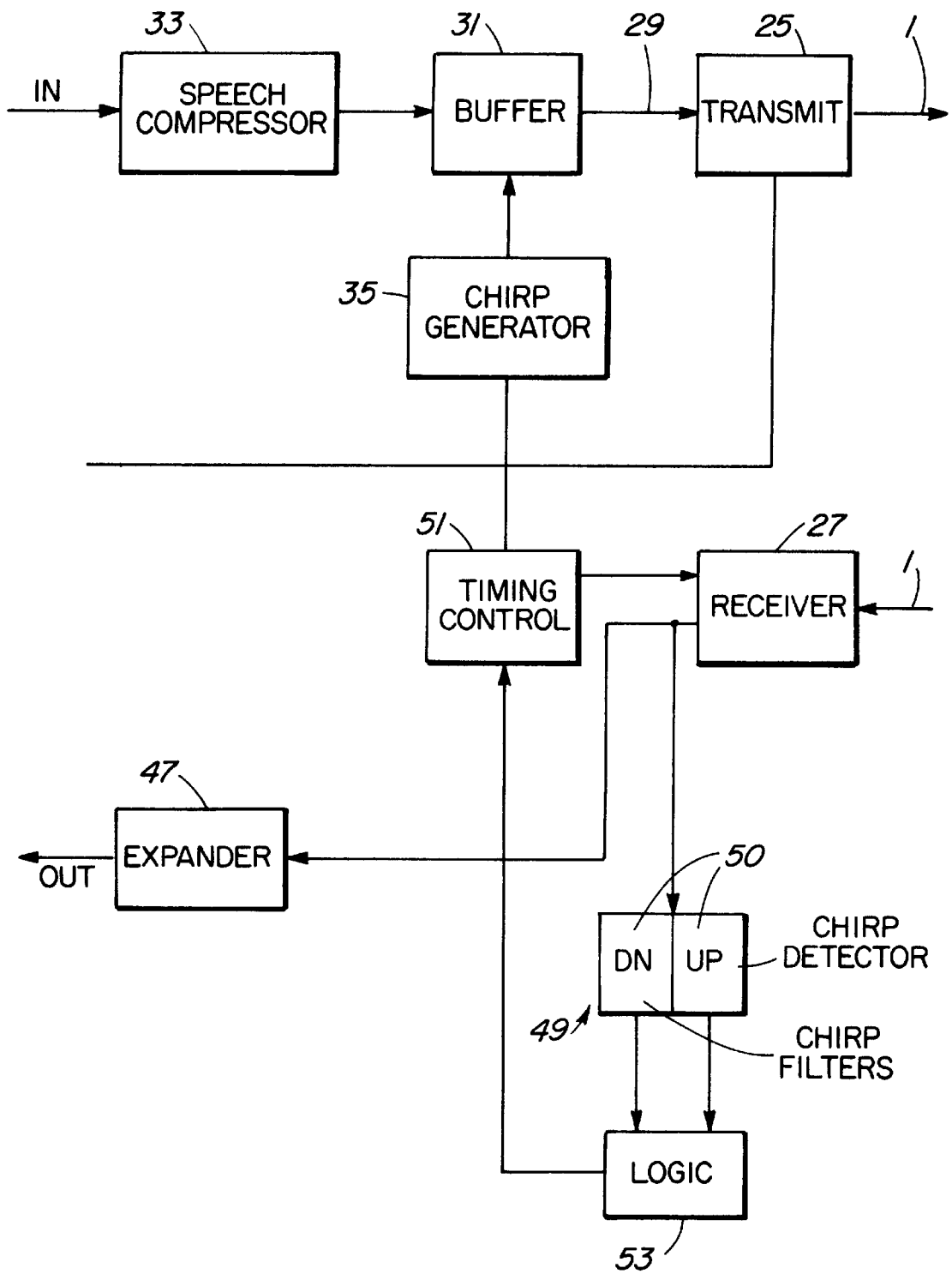

FIG. 6 illustrates a block diagram of parts of a terminal in accordance with another embodiment of the invention. A transmitter 25 transmits time division duplex signals to the channel 1 and a receiver 27 receives time division duplex signals from the same channel 1. The transmitter receives signals for transmission from the buffer 31 via link 29. The signals for transmission are assembled in buffer 31, and are comprised of compressed input speech signals from speech compressor 33 (described earlier), which have a prefix or suffix chirp signal. A chirp signal generator 35 generates chirp signals and applies them to buffer 31, where they are temporarily stored as prefix or suffixes to the compressed speech signals.

Transmit channel times are interleaved with receive channel times. As may be apparent, each channel time contains data which is comprised of a chirp signal, a compressed voice signal, and, if desired for housekeeping purposes, a data signal. The chirp signal is used for both synchronization and as a controlling signal to indicate the transmit or receive mode in which the terminal should be placed, as will be described in more detail below. The chirp signal can be located either at the beginning or at the end of the channel time (or up and down chirps respectively can be used at the beginning and end of each channel time), as a prefix and/or as a suffix to the voice signal, depending on the desired design.

The compressed voice signal output of the receiver 27 is applied to the speech expander 47, already described. In addition the, received signal is applied to a chirp detector 49, which can be comprised of chirp filters 50, one to detect the up chirp and one to detect the down chirp. If only one type of chirp is used, only one filter need be used.

The output signal of the chirp detector 49 is applied to a logic circuit for generating a signal indicating the particular transmit or receive mode in which the terminal is to be placed. That mode signal is applied to a timing control 51, which uses it as a synchronization signal, and to the transmitter 25 and to the receiver 27, to turn the transmitter and receiver oppositely on or off. The timing control applies the synchronization signal to the chirp generator 35 at a predetermined time. This causes the chirp generator 35 to generate and apply an appropriate chirp signal to the buffer 31 as a prefix, or as a suffix, or as both prefix and suffix, to the compressed voice signal stored or to be stored therein The voice signal with the chirp signal is then transmitted by the transmitter 25 when the transmitter is enabled to transmit by the logic signal resulting from the received chirp signal.

In a preferred embodiment, the synchronizing chirp signal, is transmitted before every burst of compressed audio signal. For this case the compression factor used in speech compressor 33 is less than 0.5 to provide time for the voice burst transmission. The preferred chirp signal is a frequency sweep of a sine wave through the audio transmission band of the signal. The sweep time is preferred to be greater than the expected multi-path time-differential delay of the channel. For high frequency radio channels the duration of the sweep will be typically about 10 milliseconds.

The chirp also is preferably (but is not mandatory to be) used to identify the direction of the link, by using an up chirp and a down chirp. The direction of the sweep can be altered to identify the direction of the channel. Thus the chirp sweep generated at one terminal on the channel can be upward in frequency, and the chirp sweep generated at another terminal on the channel can be downward in frequency. It is useful to detect the direction of the link if several remote units want to communicate with a base station, via the single channel.

Upon detection of the chirp by a matched filter 50, an impulse is produced, indicating the starting time of the compressed speech burst transmission.

An advantage to use of the chirp reference signal in this manner is immunity to selective fading and tolerance to co-channel interference.

A person understanding this invention may now conceive of alternative structures and embodiments or variations of the above. All those which fall within the scope of the claims appended hereto are considered to be part of the present invention.

We claim:

1. A first terminal for use in a time division duplex communication system comprising means for automatically, successively, repetitively and alternatingly transmitting and receivin compressed signals to and from another terminal via a single transmit and receive time divided channel, including means for changing between a transmit and receive mode of said first terminal in synchronism with an opposite transmit and receive mode of said another terminal, means for receiving a timing signal which is the same timing signal received by said another terminal, and means for changing said mode at intervals determined from reception of said timing signal, in which said means for receiving a timing signal is comprised of a receiver for receiving a stable time signal provided in a synchronization channel, and in which said means for receiving a timing signal is comprised of a receiver for receiving a stable time signal received from an earth satellite.

2. A terminal a defined in claim 1 in which the earth satellite is in a global positioning system.

3. A terminal for use in a time division duplex communication system comprising means for automatically, successively, repetitively and alternatingly transmitting and receiving compressed signals in a single transmit and receive time divided channel, including means for altenctingly a transmit made and a receive mode of said terminal under control of a mode changing signal, said means for changing comprising means for detecting a channel synchronization signal at the beginning or at the end of a received burst of signal, means for generating said mode changing signal in response to the form of channel synchronization signal that is detected and a means for adding a synchronization signal of a particular form for controlling channel direction to each burst of compressed signal to be transmitted.

4. A terminal as defined in claim 3 in which the form of the channel synchronization signal is a swept frequency chirp signal.

5. A terminal as defined in claim 4 in which two forms of said chirp signal are a frequency rising (up) chirp and a frequency dropping (down) chirp, for identifying a channel direction.

6. A terminal as defined in claim 5, including means for generating a particular transmit or receive mode changing signal depending on whether the chirp is an up chirp or a down chirp.

7. A terminal as defined in claim 5 including means for adding a chirp form of said synchronization signal to either the beginning or end of each burst of compressed signal to be transmitted.

8. A terminal as defined in claim 1 in which said means for generating said compressed is signals is comprised of a time domain speech compressor.

9. A terminal as defined in claim 2 in which said means for generating said compressed is signals is comprised of a time domain speech compressor.

10. A terminal as defined in claim 3 in which said means for generating said compressed is signals is comprised of a time domain speech compressor.

11. A terminal as defined in claim 7 in which said means for generating said compressed is signals is comprised of a time domain speech compressor.

12. A terminal as defined in claim 2 in which said means for generating said compressed is signals is comprised of a waveform similarity synchronized overlap-add compressor.

13. A terminal as defined in claim 3 in which said means for generating said compressed is signals is comprised of a waveform similarity synchronized overlap-add compressor.

14. A terminal as defined in claim 7 in which said means for generating said compressed is signals is comprised of a waveform similarity synchronized overlap-add compressor.

15. A terminal as defined in claim 7 in which the time interval of each chirp is greater than an expected multi-path time-differential delay of the channel.

16. A method of time division duplex communication comprising time dividing a single communication channel into successive evenly spaced short time intervals, transmitting and receiving time domain compressed speech signals alternatively in each direction in the time divided duplex communication channel, and synchronizing timing of the time division from a single source of timing signal accessible by each station communication via said channel, including receiving said timing signals from an earth satellite.

17. A method of time division duplex communication comprising time dividing a single communication channel into successive evenly spaced short time intervals, transmitting and receiving time domain compressed speech signals alternatively in each direction in the time directed duplex communication channel, transmitting a chirp signal at the beginning or at the end of each first of compressed speech signal, and changing a transmit or receive mode at a terminal of the communication channel upon receipt of the chirp signal.

18. A method as defined in claim 17 including controlling the up or down nature of the chirp signal to identify a channel direction, and changing the transmit or receive mode of the terminal depending on the up or down nature of the chirp signal.

\* \* \* \* \*